United States Patent [19]

Fiorina et al.

[11] Patent Number: 4,499,764
[45] Date of Patent: Feb. 19, 1985

[54] MODULAR METERING APPARATUS

[75] Inventors: Mark A. Fiorina, Milwaukee; Todd N. Roberts, Germantown, both of Wis.

[73] Assignee: Badger Meter, Inc., Milwaukee, Wis.

[21] Appl. No.: 416,698

[22] Filed: Sep. 10, 1982

[51] Int. Cl.³ .............................................. G01F 3/08
[52] U.S. Cl. ...................................... 73/253; 73/257; 418/60
[58] Field of Search ................. 73/232, 252, 256, 257, 73/253; 91/339; 92/120; 417/481; 418/5, 60, 11, 209, 210, 215

[56] References Cited

U.S. PATENT DOCUMENTS

| 421,489 | 2/1890 | Gaskill | 73/257 |
| 2,241,132 | 5/1941 | Horton | 73/253 |
| 3,173,606 | 3/1965 | Dobrowolski | 418/5 X |
| 3,791,780 | 2/1974 | Fritch et al. | 418/60 |
| 4,403,928 | 9/1983 | Jones | 418/60 |

Primary Examiner—Charles A. Ruehl
Attorney, Agent, or Firm—Neuman, Williams, Anderson & Olson

[57] ABSTRACT

A modular oscillating piston-type fluid meter including a plurality of three or more oscillating piston measuring modules in stacked relationship to each other, each of the measuring modules having a piston operatively connected for synchronous, conjoint rotation with the pistons of adjacent measuring modules. The measuring modules are substantially identical to each other and include a body portion which defines a cylindrical chamber. Outlet and inlet ports communicate with the cylindrical chamber. Fluid is supplied to the ports by internal or external manifolding conduits.

21 Claims, 9 Drawing Figures

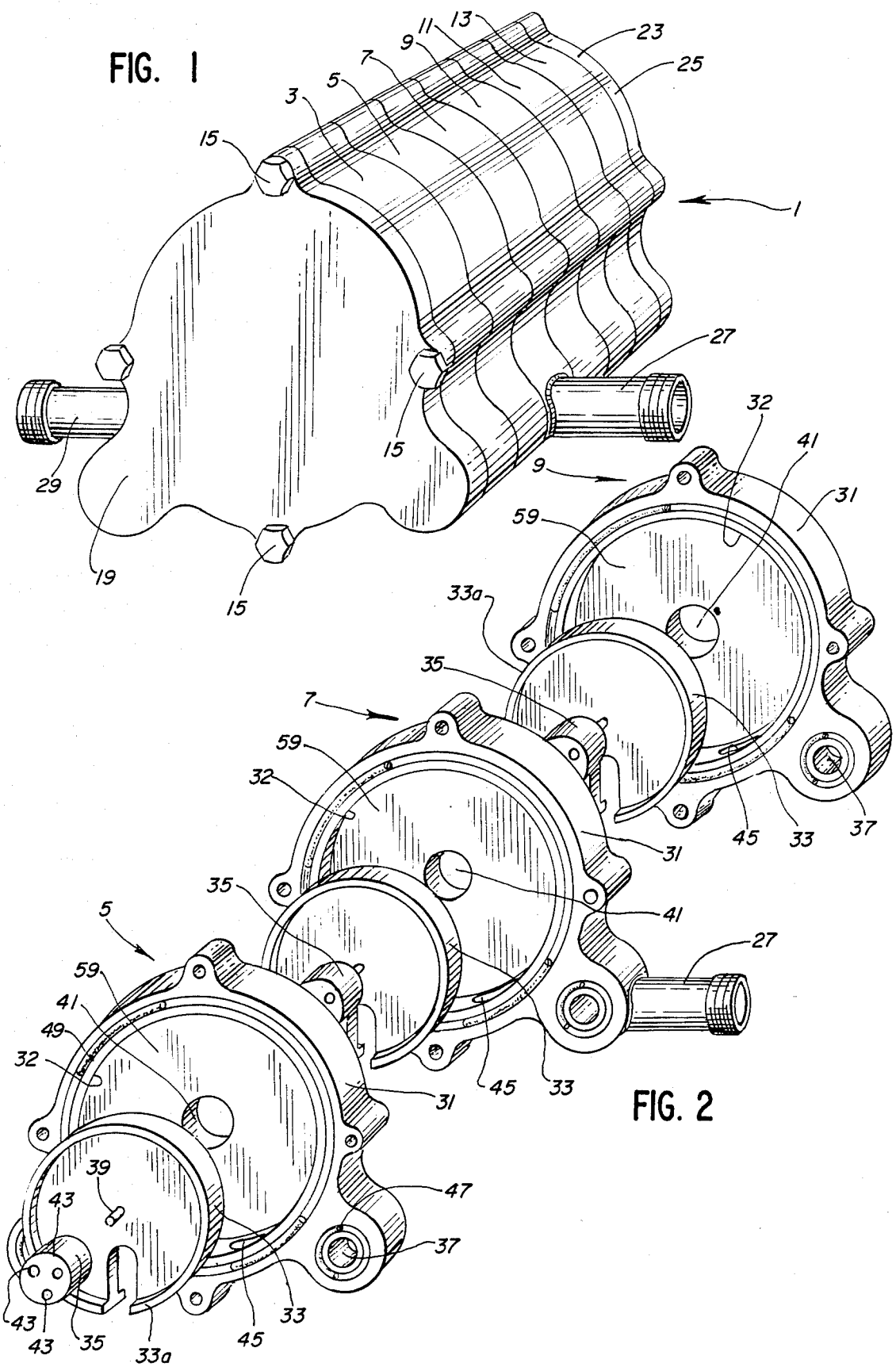

MODULAR METERING APPARATUS

BACKGROUND OF THE INVENTION

This invention relates generally to meters, and in particular to fluid meters of the oscillating piston or rotary piston type, hereinafter referred to an oscillating piston meters.

The prior art includes a variety of oscillating piston meters. Such meters typically suffer from drawbacks, however, which are either minimized or eliminated in the present invention. One drawback of the prior meters is that the range of flow rates at which acceptable metering accuracy can be maintained is limited by the dynamic instability inherent in the design of such prior art meters. The piston represents an eccentric rotating weight. As the flow rate of the metered fluid increases, the rotational velocity of the piston within the metering chamber increases accordingly. Where the meter comprises a single metering chamber with a single piston therein (such oscillating piston meters hereinafter referred to as single piston meters), the dynamic instability of the meter causes it to vibrate. Such vibration is detrimental to the useful life and accuracy of the meter because it dramatically accelerates wear on the components of the meter, with the concomitant result that the close dimensional tolerances, which appear to be essential to the accuracy of the prior art oscillating piston meters, are not maintained, and internal leakage results. Such vibration is also detrimental to the integrity of the seals which must be maintained at the inflow and outflow connections to the meter. Additional problems resulting from such vibration include energy losses which decrease the hydraulic head of the fluid being metered, and the noise which results from such vibration.

Another disadvantage of the prior art single piston meters is that the acceleration and hence the instantaneous velocity achieved by the piston, upon being subjected to a force generated by the metered fluid, is dependent upon the location of the piston within the metering chamber. This produces a non-linear response for the meter of its output torque to such force, and, hence, output torque and rate of rotation is erratic.

Yet another disadvantage of the prior art single piston meters is that they may have what is known in the art as a dead spot. If the flow of the measured fluid stops, the piston may come to a rest position within the metering chamber such that the sidewall of the piston is against the inflow port to the metering chamber. When the measured fluid attempts to resume flowing, it is difficult, and may in fact be impossible, for the fluid to dislodge the piston from its position against the inflow port.

In some prior art oscillating piston meters attempts have been made to minimize the dynamic instability and other disadvantages associated with single piston meters by including two pistons, substantially 180° out of phase with each other, within the metering chamber. Such meters hereinafter are referred to as dual piston meters. There are several drawbacks associated with the prior art dual piston meters. One disadvantage is that they require complex internal porting between the various components of the meter. Such internal porting increases the number and complexity of the dual piston meter's constituent parts, thereby contributing to sustaining the cost of manufacture and assembly of such meters.

Further, the tortuous path which the metered fluid is required to follow through the prior art dual piston meters decreases their efficiency and also limits the range of flow rates over which acceptable metering accuracy can be maintained. Thus, where the hydraulic head of the metered fluid is low, and the flow rate of the metered fluid is accordingly small, the inefficiency of the prior art dual piston meters may produce inaccurate readings.

Yet another disadvantage of the prior art oscillating piston meters is that they are sized and designed to have a certain maximum flow rate metering capacity. In order to provide oscillating piston meters having a variety of maximum flow rate metering capacities, it is necessary to provide a variety of different size pistons, metering chambers, housings and other constituent parts of the prior art meters. This, in turn, contributes to sustaining the cost of such prior art meters.

A further disadvantage of the prior art oscillating piston meters is that the pistons and other components used therein require several manufacturing steps and also require the maintenance of close dimensional tolerances. (This problem is discussed, in part, in Kullman U.S. Pat. No. 3,587,314, particularly at Column 1, lines 10-28.) The present invention is intended to overcome or minimize these and other disadvantages associated with the prior art oscillating piston meters.

SUMMARY OF THE INVENTION

It is an object of this invention to provide an improved oscillating piston meter.

It is a more specific object of the present invention to provide an improved oscillating piston meter which overcomes the aforementioned problems.

It is a further object of the present invention to provide an oscillating piston meter which eliminates or minimizes the dynamic instability and vibrations typically associated with oscillating piston meters.

It is a futher object of the present invention to provide an oscillating piston meter which will provide good metering accuracy over a wide range of flow rates.

It is a further object of the present invention to provide an oscillating piston meter which does not have a dead spot.

It is a further object of the present invention to provide an oscillating piston meter with a linear or nearly linear response for output torque relative to the force of the metered fluid.

It is a further object of the present invention to provide a simple modular oscillating piston meter which will provide a variety of flow rate metering capacities while minimizing the need for having an assortment of different size meters or parts.

It is a further object of the present invention to provide a simple modular oscillating piston meter which is economical to manufacture and assemble.

It is a further object of the present invention to provide an improved piston for use in oscillating piston meters.

It is a further object of the present invention to provide an oscillating piston meter which minimizes the inefficiencies associated with the oscillating piston meters of the prior art.

Other objects and advantages of the invention will become apparent upon reading the following detailed description and appended claims, and upon reference to the accompanying drawings.

In accordance with an embodiment of the invention, a modular oscillating piston meter is supplied having a plurality of oscillating piston measuring modules which are operatively connected to each other for synchronous, conjoint rotation. Each such metering module comprises a body portion including a metering chamber with inflow and outflow ports communicating therewith, and a piston disposed therein. The measuring modules are hydraulically interconnected in parallel to each other, either by internal manifolding or by external piping. Multiple modules are assembled in stacked relationship to each other, front to back. The assembled metering modules are provided with front and back covers, and with division plate means which divide each metering chamber between the inflow and outflow port and engage each piston while permitting the piston to oscillate. The oscillatory motion of the piston within each metering chamber is synchronized with the oscillatory motion of the piston of each adjacent metering module through pivotal engagement with a crank disposed between the respective pistons in the respective intervening bulkhead of the body portions. Each crank maintains a predetermined angular positional relationship between engaged pistons. Where, for example, the completed meter comprises three oscillating piston measuring modules, each crank disc will hold the respective pistons 120° apart. Thus, the oscillatory motion of each piston in the completed meter will be 120° out of phase with that of the piston of each next adjacent measuring module.

BRIEF DESCRIPTION OF THE DRAWINGS

For a more complete understanding of this invention, reference should now be made to the embodiments illustrated in greater detail in the accompanying drawings. In the drawings:

FIG. 1 is a perspective view of an assembled embodiment of the present invention;

FIG. 2 is an exploded perspective view of three measuring modules of one embodiment of the present invention;

Figure 3:
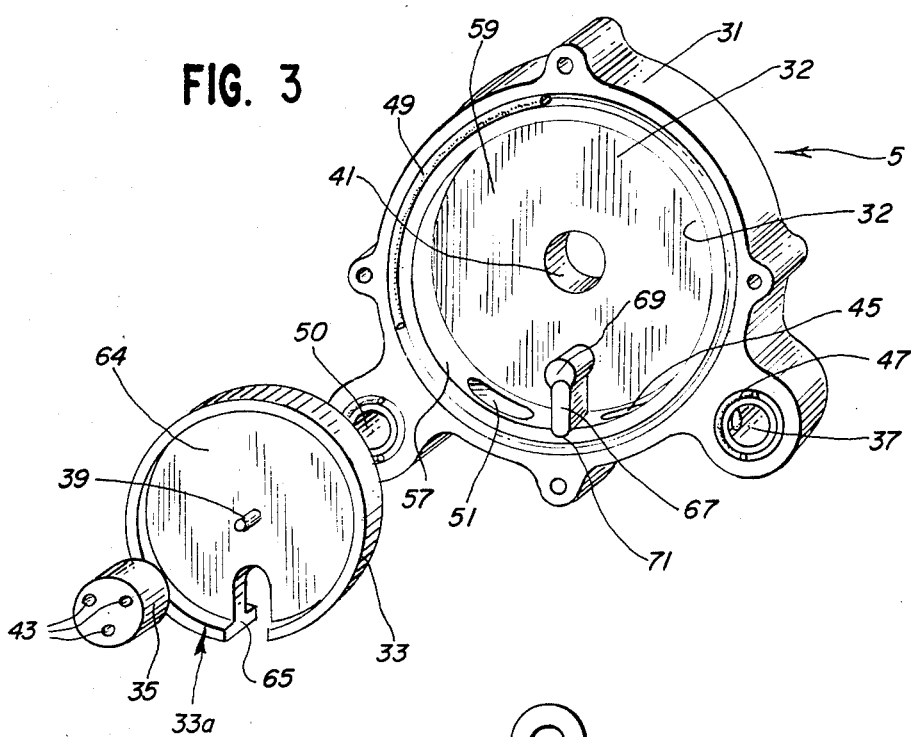
FIG. 3 is a detailed exploded perspective view one measuring module of one embodiment of the present invention.

It should be understood that the drawings are not necessarily to scale and the embodiments are sometimes illustrated by graphic symbols, phantom lines, diagrammatic representations, and fragmentary views. In certain instances, details which were not necessary for an understanding of the present invention or which render other details difficult to perceive may have been omitted. It should be understood, of course, that the invention is not necessarily limited to the particular embodiments illustrated herein.

DETAILED DESCRIPTION OF THE DRAWINGS INCLUDING PREFERRED EMBODIMENTS

Turning first to FIG. 1, there is shown in perspective view an assembled fluid measuring meter 1 embodying teachings of the present invention. The meter 1 is shown having six oscillating piston measuring modules 3, 5, 7, 9, 11 and 13, in mutually superimposed or stacked relationship to each other. Also shown are a first cover plate 19 and a second cover plate 23. Second cover plate 23 is provided with means which permit the assembled fluid measuring meter 1 to be operatively connected to means (not shown) for sensing and registering the rotations of the uppermost piston pin of meter 1. The six oscillating piston measuring modules 3, 5, 7, 9, 11 and 13, and cover plates 19 and 23, are held in stacked relationship to each other by bolts 15. Also shown are inlet conduit 27 and outlet conduit 29. While the inlet conduit 27 and the outlet conduit 29 are shown communicating with a centrally located module 7, it will be appreciated by those of ordinary skill in the art (namely, designers and manufacturers of oscillating piston type water meters) that said inlet conduit 27 and said outlet conduit 29 may communicate with any of the measuring modules 3, 5, 7, 9, 11, and 13 of an assembled meter 1. Except for the addition of the inlet and outlet conduits on one module, the several modules are identical to one another and are mutually compatible for superimposed cooperative joining with one another.

Turning now to FIG. 2 there is shown an exploded perspective view of three of the oscillating piston measuring modules 5, 7, and 9 of one embodiment of the present invention. Each of said measuring modules comprises a body portion 31 defining a cylindrical chamber 32 open at one end and a piston 33 in each chamber. The pistons 33 are, when assembled, mechanically interconnected for synchronous, conjoint rotation by interconnecting means. In the embodiment of the invention shown in FIG. 2, part of said interconnecting means comprise crank discs 35, piston pins 39, and crank openings 41, said crank openings being located in the partition or bulkhead 59 of body portion 31. Where, as in the embodiment shown in FIG. 2, the assembled meter comprises three or multiples of three modules, the crank discs 35 are preferrentially provided with three pin receiving openings 43 spaced substantially 120° apart with reference to the axial center of the crank discs 35. Said pin receiving means 43 in each of said crank discs 35 receive a piston pin 39, located at the center of each respective adjacent piston 33, and permit free rotation of those pins within the pin receiving openings. Each piston pin 39 is of sufficient length so that when the fluid measuring meter 1 is assembled each piston pin 39 can simultaneously engage two crank discs 43 of adjacent oscillating piston measuring modules.

It is to be understood that piston pin 39 of an end module, e.g., module 3 in FIG. 1, need be of sufficient length to engage only one crank disc 43 because one face of end module 3 is capped by first cover plate 19. No disc is required at that end. Alternatively, however, as shown in FIG. 5, the first cover plate 19 (119 in FIG. 5) may be provided with a cylindrical recess 120 which accommodates a further crank disc thereby preferentially permitting piston pin 39 of the end module to be of the same length as all other piston pins 39 and providing crank guidance at both sides of this piston. To this end, a crank disc 35 having receiving means 43 may be located in the end recess 120 so that pin 39 is pivotally secured at each of its ends to minimize any vibrations or "wobble" of the end piston 33 during the operation of the meter. It should also be understood that the piston 39 of one end module, e.g., module 13 in FIG. 1, may be of sufficient length to operatively engage sensing means (see FIG. 5) for registering the rotations of the pistons.

Also, as shown in FIG. 2, internal inlet manifolding conduits 37 are formed in each housing 31. When the modules are assembled, said internal inlet manifolding conduits 37 are mutually aligned and communicate hydraulically with one another in sealed relationship to constitute an inlet manifold. Moreover, each of said inlet manifolding conduits 37 is connected hydraulically with an inlet port 45 in the chamber 32 of the respective module through an internal bore 46 in the housing 31; see FIG. 4. A similar arrangement of internal outlet manifolding conduits 50, outlet ports 51 and bores 52 is provided at the opposite side of each module; see FIGS. 3 and 4. Inlet connection conduit 27 communicates with at least one of said inlet conduits 37 and therethrough with the other conduits 37 and the associated bores 46 and ports 45. Similarly, outlet connection conduit 29 communicates with at least one of said outlet internal manifolding conduits 50 and therethrough with the several outlet ports 51.

As shown, each of the measuring modules 5, 7, and 9, are hermetically sealed to one another through the use of O-rings 47 and 49. However, as one of ordinary skill in the pertinent art would appreciate, any suitable means may be used for effecting seals between the modules; for example, gaskets may be employed.

Turning now to FIG. 3, there is shown an exploded perspective view of one oscillating piston measuring module 5 of one embodiment of the present invention. In FIG. 3 the internal outlet manifolding conduit 50 is shown communicating through outlet port 51 with the chamber 32 of body portion 31. The cylindrical chamber 32 is defined by annular sidewall 57 of the body portion 31 and by the partition or bulkhead 59 of the body portion 31. Disposed within the bulkhead 59 is cylindrical opening 41 having a diameter slightly greater than the diameter of a disc 35. The depth of the cylindrical opening 41 in bulkhead 59 is substantially equal to the axial dimension of the disc 35. When assembled, said crank opening 41 receives crank disc 35 while permitting the free rotation of crank disc 35 therein. The piston 33 has an outside diameter or lateral dimension less than the inside diameter or lateral dimension of the chamber 32. The peripheral sealing rim 33*a* of the piston 33 has an axial dimension or height substantially equal to the height of the sidewall 57 of the chamber 32.

The web 64 of piston 33 is preferentially, though not essentially, of a thickness less than the height of the peripheral sealing rim 33*a* so that friction losses and the rotational inertia of piston 33 are kept to a minimum, thereby increasing the low flow rate sensitivity and operating range of the meter. The piston 33 also is provided with a slot 65 for engaging division plate means which, as illustrated in FIG. 3, may comprise a partition plate 67 and slotted cylindrical pin 69 located within the chamber 32 between the inlet port 45 and outlet port 51. The division plate means and slot 65 comprise cooperating means whereby the piston 33 oscillates in response to the flow of fluid through the cylindrical chamber 32 from the inlet port 45 and outlet port 51. As shown in FIG. 3, the pin 69 engages over the inner end of the partition plate 67. The other end of said partition plate 67 is held in place by groove 71 in the sidewall 57 of the chamber 33. When the meter is assembled and is in operation, the pin 69 engages the sides of slot 65 of the piston 33. That is, the diameter of pin 69 is substantially equal to the transverse dimension of slot 65 of piston 33 such that during operation the pin 69 maintains effective hydraulic sealing contact with the sides of the slot 65, as the piston 33 oscillates within the cylindrical chamber 32.

Figure 4:
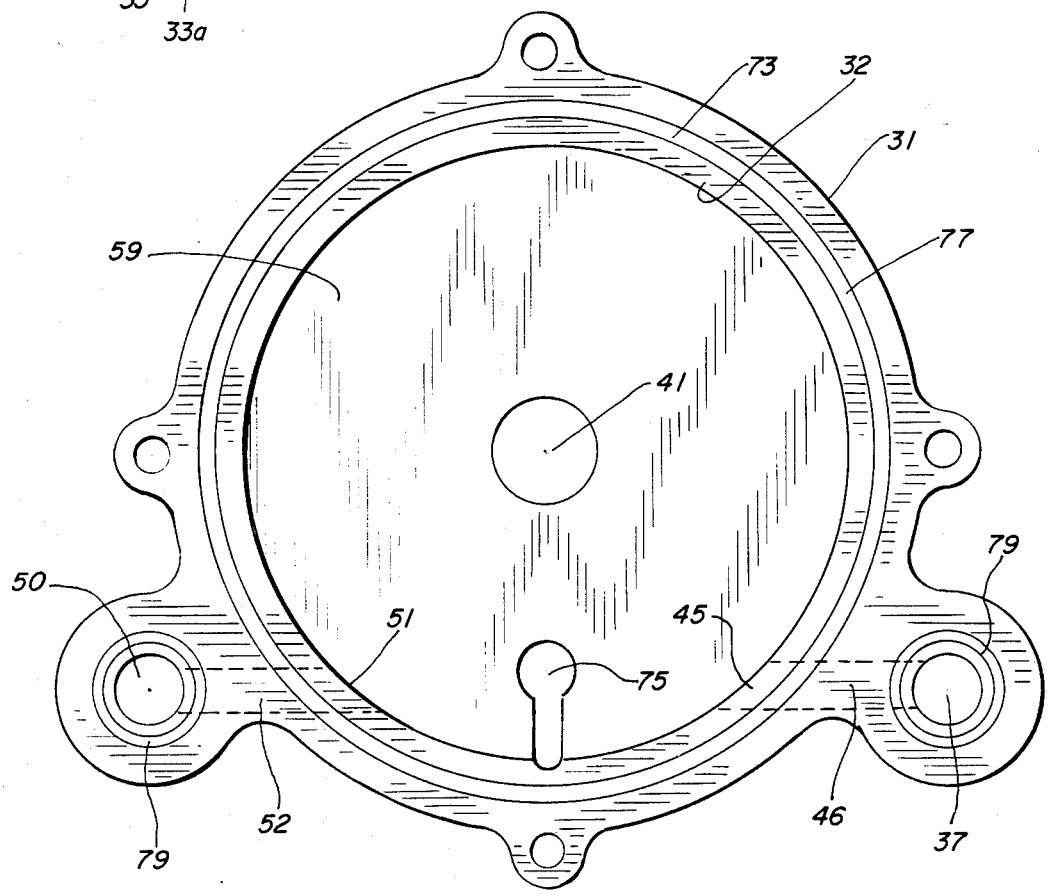
FIG. 4 is a top plan view of one measuring module of one embodiment of the present invention.

A single pin and partition plate may be provided of sufficient length to provide division plate means for each measuring module of the assembled fluid measuring meter 1. In such an embodiment each bulkhead 59 must be provided with an opening 75, as shown in FIG. 4, to permit the pin and partition plate to extend through each module. With such a construction, the assembly is simplified, the number of parts required is reduced, and it is believed that a single common pin and partition plate construction may improve the structural integrity of the assembled meter, minimize vibrations and increase the operative range and life of the meter. On the other hand, by providing separate division plate elements in each module, modularity is maintained. Of course, it will be appreciated by those of ordinary skill in the pertinent art that the present invention is not limited to meters having division plate means such as those just described. Alternatively, partition plates and pins may be provided for sub-units of two, three or more measuring modules. Moreover, division plate means comprising a partition which is unitary with each body portion 31 (i.e., cast together with or welded) may also be employed.

Referring now to FIG. 4 inlet port 45 and outlet port 51 are shown by dashed lines. A groove 77 is provided about the perimeter of the body portion 31 for receiving O-ring 49 while grooves 79 are provided for receiving O-rings 47. Again, however, the use of O-rings is not essential to the practice of this invention and any suitable means for sealing the modules, such as gaskets, may be employed.

FIG. 5 is a side elevation view in cross section of another embodiment of the present invention. This embodiment is substantially similar to the embodiment described in the preceeding figures, with the exception that in place of six measuring modules three measuring modules are employed, and instead of internal manifolding, manifolding is accomplished through external conduits to each oscillating piston measuring module. The components of the embodiment shown in FIG. 5 correspond to similar parts of the fluid measuring meter 1 described above and are identified by corresponding numerals in the 100 series.

The operation of the present invention can best be understood by reference to FIGS. 5, 5A, 5B, and 5C. With reference first to FIG. 5 it will be appreciated that synchronous, conjoint rotation of the pistons 133 is accomplished by the interconnecting means which comprise crank discs 135 and piston pins 139. Because in this embodiment three oscillating piston measuring modules have been incorporated in the final assembled embodiment, the angular spacing between each of the pins 139 is preferentially 120° apart. This arrangement maintains the pistons 133 a corresponding 120° out of phase with one another during the operation of the assembled fluid measured meter 101. This alignment provides for smooth operation of the meter, decreases vibrations, eliminates dead spots and significantly increases the operating range of the meter. For example, it has been determined experimentally that a prototype meter of the type described having three oscillating piston measuring modules can operate at over 3000 r.p.m. with minimal vibrations. Flow rates in the ranges of 0.01 to 1.0 g.p.m. have been measured within acceptable tolerances of ±2% with such a meter having cylindrical chambers 32 of 1.500" I.D. and 0.250" deep, with pistons 33 of 1.338" O.D. and 0.248" thickness at their peripheral sealing rims 33a.

Sensing means 178 are provided, as also shown in FIG. 5, for sensing the rotations of the uppermost piston pin 139, as by driving a rotary magnet. By means well known to those skilled in the art the number of rotations sensed by sensing means 178 are counted by register 180 and converted by appropriate factors to volumetric data.

Figure 5A:
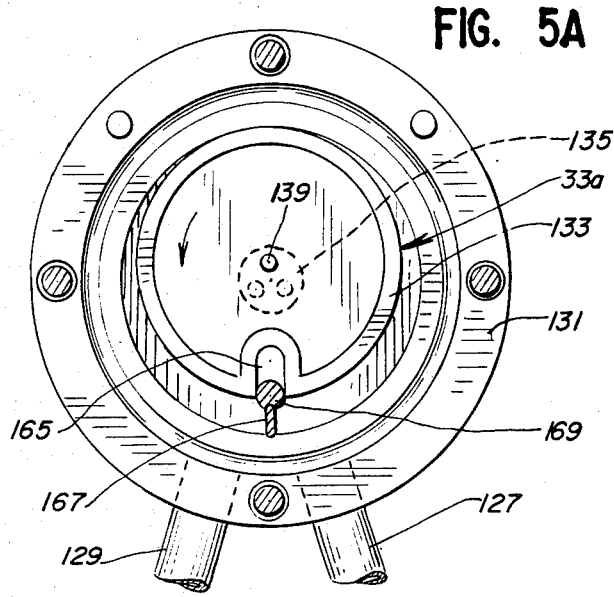
FIG. 5A is a sectional plan view of one embodiment of the present invention taken alone line 5A—5A in FIG. 5.
Figure 5B:
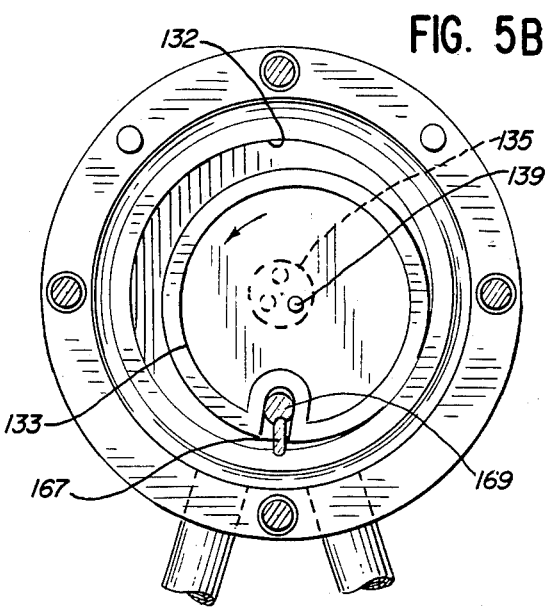
FIG. 5B is a sectional plan view of one embodiment of the present invention taken along line 5B—5B in FIG. 5.
Figure 5C:
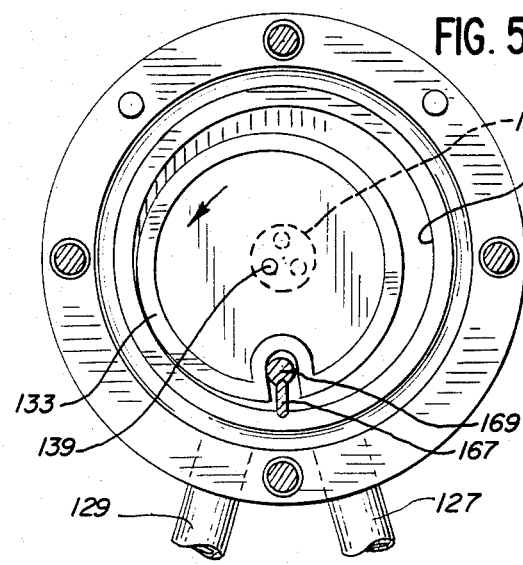
FIG. 5C is a sectional plan view of one embodiment of the present invention taken alone line 5C—5C in FIG. 5.
Figure 5:
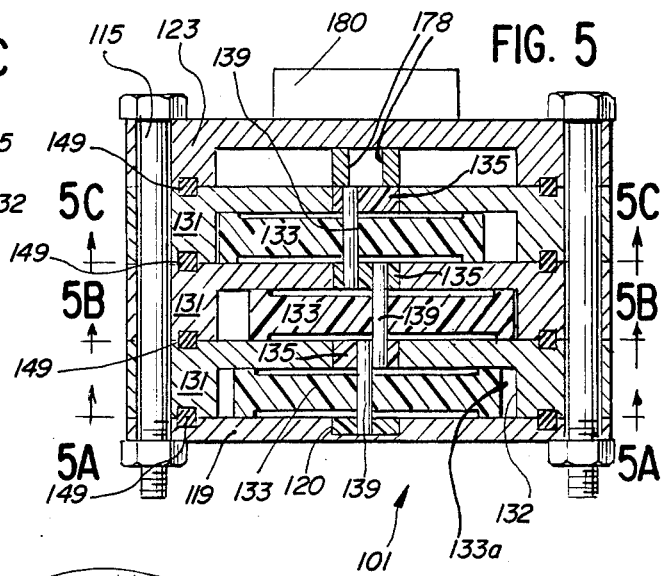
FIG. 5 is an elevation view in cross section of one assembled embodiment of the present invention.

Turning to FIG. 5A, one instantaneous position of the lowermost piston 133 relative to the lowermost body portion 131 is shown. In this position, fluid is entering through external inlet conduit 127 to drive the piston 133 counterclockwise. The motion of the piston 133 is oscillatory because of the crank guiding of the respective disc 135 and the engagement of the respective slot 165 on the division plate means. In rotating counterclockwise, the piston is forcing fluid on the left side of the division plate means out through external outlet conduit 129. One complete revolution of the piston 133 within the cylinder 155 corresponds to the flow of a volume of fluid which is approximately equal to the difference between the volume of the cylindrical cavity of the module and the volume of the piston. Turning now to FIG. 5B, the corresponding instantaneous position of the intermediate piston 133 relative to the intermediate body portion 131 is shown. It will be observed that the instantaneous position of this piston 133 relative to that of the lowermost piston 133 shown in FIG. 5A is such that the pistons are 120° apart in their oscillatory cycle. Similarly, with reference to FIG. 5C, it can be observed that the corresponding instantaneous position of the uppermost piston 133 relative to the uppermost body portion 131 is such that its instantaneous position is 120° apart cyclically from the positions of the intermediate and lowermost pistons 133. It will be appreciated by those skilled in the art that the total volume of metered fluid which corresponds to one complete revolution of the uppermost pin 135 is an amount approximately equal to the difference between the combined volumes of the cylinders and the combined volume of the pistons of the meter assembly.

Figure 6:
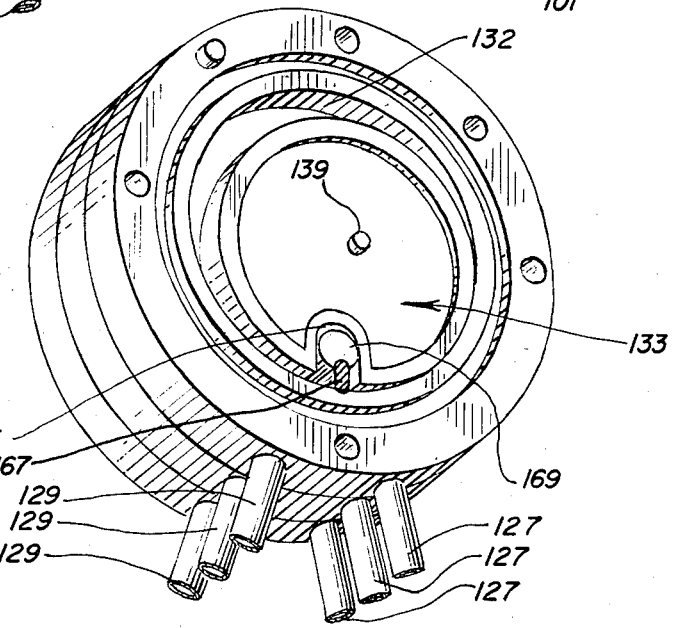
FIG. 6 is a perspective view of one embodiment of the present invention in partially assembled form.

Finally with reference to FIG. 6, there is shown in perspective view a partially assembled embodiment of the present invention corresponding to the embodiment referred to in FIGS. 5, 5A, 5B, and 5C. It will be observed that each measuring module is provided with a separate external inlet conduit 127 and a separate outflow conduit 129 communicating with the respective chamber 132 on opposite sides of the division plate means 167 and 169. In operation the external inflow conduits 127 will be connected to a single inflow source while the external outflow conduits 129 will be connected to a single outflow source.

From the above description it is apparent that the objects of the present invention have been achieved. The modules may be of simple, rugged, identical, mutually compatible design and size. Greater capacity may be obtained simply by increasing the number of modules in a given assembly. Moreover, the resulting meters are dynamically balanced and capable of operation over a wide range of speeds, with concomitant capacity ranges.

While certain embodiments have been set forth, alternative embodiments and various modifications will be apparent to those skilled in the art. For example, while the embodiments described are shown with three or multiples of three measuring modules, it will be appreciated that the present invention is not necessarily limited to such embodiments. Thus, an assembled fluid measuring meter may be provided having four or multiples of four measuring modules, five or multiples of five measuring modules, seven or multiples of seven measuring modules, etc. One skilled in the art will readily appreciate, however, that where multiples of other than three measuring modules are utilized the crank connections should provide angular offset between the pistons of substantially 360°/N, or multiples of substantially 360°/N (where N is an integer equal to the total number of measuring modules desired to be employed in the assembled fluid measuring meter) to maintain the best dynamic balance of the assembly. Thus, for example, when a total of four modules are employed, the angular offset between the pin receiving means 43 or 143 should be substantially 360°/4 or 90°; for five modules, the angular offset should be substantially 360°/5 or 72°.

Having described the invention, what is claimed is:

1. An apparatus for metering fluid, said apparatus comprising:
    a plurality of three or more oscillating piston measuring modules in stacked relation to each other, each of said modules having a body portion which defines a cylindrical chamber and which has inlet and outlet ports communicating with said chamber and an oscillatable piston with cooperating means disposed within said chamber for metering the flow of fluid passing through said chamber from said inlet to said outlet port, said piston oscillating in response to the flow of fluid through said chamber, said piston being connected for synchronous, conjoint rotation with the piston of at least one adjacent oscillating piston measuring module;
    an inlet manifolding means for interconnecting said inlet ports of said measuring modules hydraulically in parallel to one another and supplying fluid to said inlet ports; and
    an outlet manifolding means for interconnecting said outlet ports of said measuring modules hydraulically in parallel to one another and receiving fluid from said outlet ports.

2. Apparatus as in claim 1 including means for operatively connecting said pistons of said measuring modules for synchronous, conjoint rotation with one another, said conjoint rotation of said pistons being a measure of the total fluid flow through said measuring modules.

3. Apparatus as in claim 2 wherein said means for operatively connecting said pistons comprise:
    a plurality of piston pins, one of said pins for each of said oscillatable pistons and in operative engagement therewith; and
    crank discs having means therein for simultaneously engaging said piston pins of two adjacent pistons and maintaining said pins apart by a predetermined angle while permitting the free rotation of said crank discs concomitantly with the respective adjacent pistons.

4. Apparatus as in claim 1 wherein said inlet manifolding means comprise:
internal inlet manifolding conduits within the body portions of each of said measuring modules which communicate with said inlet ports; and
at least one inflow conduit which communicates with at least one of said internal inlet manifolding conduits.

5. Apparatus as in claim 1 wherein said outlet manifolding means comprise:
internal outlet manifolding conduits within the body portions of each of said measuring modules, said internal outlet manifolding conduits in communication with said outlet ports; and
at least one outflow conduit which communicates with at least one of said internal outlet manifolding conduits.

6. Apparatus as in claim 1 wherein said inlet manifolding means comprise separate external inlet conduits for each of said measuring modules, each of said external inlet conduits communicating with the inlet port of the respective measuring module.

7. Apparatus as in claim 1 wherein said outlet manifolding means comprise separate external outlet conduits for each of said measuring modules, each of said external outlet conduits communicating with the outlet port of the respective measuring module.

8. Apparatus as in claim 1 wherein each of said modules except one end module includes a partition for separating the metering chambers of two adjacent modules.

9. Apparatus as in claim 8 including interconnection means spanning each of said partitions between such chambers and pivotally connected to the respective adjacent pistons.

10. Apparatus as in claim 9 in which each of said interconnection means is rotatably supported in the respective partition.

11. Apparatus as in claim 1 wherein said cooperating means within said cylindrical chamber comprises division plate means, and a slot in said oscillatable piston in operative engagement with said division plate means, said division plate means located between said inlet port and said outlet port along a radius of said cylindrical chamber.

12. Apparatus as in claim 11 wherein said division plate means comprise a separate bulkhead in each of said measuring modules and unitary with said body portion thereof.

13. Apparatus as in claim 1 wherein said oscillating piston measuring modules are identical to one another.

14. Apparatus as in claim 13 wherein said oscillating piston measuring modules are complementary of one another when assembled, said body portion of each of said measuring modules having an annular sidewall and bulkhead which define said cylindrical chamber, said bulkhead of each module except an end module providing a closure for the body portion of the next adjacent measuring module.

15. Apparatus as in claims 1, 4, 5, 6, 7, 11 or 12 wherein each of said oscillatable pistons is operatively connected 360°/N out of phase with the piston of the next adjacent oscillating piston measuring module, where N is an integer equal to the total number of measuring modules of the apparatus.

16. A fluid metering module comprising a body portion having front and back surfaces of complementary configuration for mating engagement of said front surface with the back surface of a like second module and engagement of said back surface with the front surface of a like third module, said body defining a cylindrical chamber therewithin open through said front surface and having a back partition, and inlet and outlet ports communicating with said chamber; a piston disposable within said chamber for oscillation therewithin, and cooperating means in said chamber whereby the flow of fluid between said inlet and outlet ports causes concomitant oscillations of said piston; and means for guiding the oscillating motion of said piston and for interengaging said piston with the piston of such a like second module when in front-to-back surface mating engagement therewith.

17. A module as in claim 16 wherein said guiding and interengaging means comprise a crank disc rotatably mountable in said back partition of said chamber and means for engaging said piston with said crank disc and with a corresponding crank disc of such a like second module when in such mating engagement therewith.

18. Apparatus for metering the flow of fluid, said apparatus comprising: a plurality of three or more oscillating piston measuring modules in stacked relationship to each other, each of said measuring modules having a chamber through which said fluid flows, an oscillatable piston in each of said chambers which oscillates in response to the flow of fluid; and means for operatively connecting said pistons of said measuring modules for synchronous, conjoint rotation with one another, wherein the conjoint rotation of said pistons is a measure of the total fluid flow through said measuring modules.

19. Apparatus as in claim 18, wherein said oscillating piston measuring modules are identical to one another.

20. Apparatus as in claim 19, wherein said oscillating piston measuring modules are complementary of one another when assembled, each of said measuring modules having an annular sidewall and bulkhead which define said cylindrical chamber, said bulkhead of each module except an end module providing a closure for the body portion of the next adjacent measuring module.

21. Apparatus as in claim 18, wherein each of said oscillatable pistons is operatively connected 360°/N out of phase with the piston of the next adjacent oscillating piston measuring module, where N is an integer equal to the total number of measuring modules of the apparatus.

* * * * *